United States Patent [19]

Vandyk

[11] Patent Number: 5,691,056
[45] Date of Patent: Nov. 25, 1997

[54] TARP SECURING HOOK

[76] Inventor: Gerald Vandyk, Box 7124, Edson, Alberta, Canada, T7E IV4

[21] Appl. No.: 311,321

[22] Filed: Sep. 23, 1994

[51] Int. Cl.$^6$ ............................................. A44B 13/00
[52] U.S. Cl. ............................ 428/369; 24/363; 150/154
[58] Field of Search ........................ 428/99, 369; 24/363, 24/366, 360, 356, 357, 368, 711.3; D8/370, 367; D11/209; 150/154

[56] References Cited

U.S. PATENT DOCUMENTS

D. 297,848  9/1988  Burenga ................................ D15/32
2,641,315  6/1953  Martens ................................. 24/363
4,891,930  1/1990  Schaefer ............................... 53/587

FOREIGN PATENT DOCUMENTS 5780  of 1887  United Kingdom ................ 24/363

*Primary Examiner*—Alexander Thomas

[57] ABSTRACT

A hook for securing a tarp to a bale of hay. The inventive device includes a substantially straight main shank having an insertion tip formed at a first end thereof to permit insertion of the shank into a bale of hay. An engaging hook is integrally formed at a second end of the main shank and arranged to mount a bungee cord utilized to secure a tarp over the associated bale of hay.

11 Claims, 3 Drawing Sheets

TARP SECURING HOOK

BACKGROUND OF THE INVENTION

1. Field of the Invention

The present invention relates to securing structures and more particularly pertains to a tarp securing hook for securing a tarp to a bale of hay.

2. Description of the Prior Art

The use of securing structures is known in the prior art. More specifically, securing structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art securing structures include U.S. Pat. No. 5,189,866; U.S. Pat. No. 5,098,754; U.S. Pat. No. 4,891,930; U.S. Pat. No. 4,712,672; and U.S. Pat. No. D,297,848.

While these devices fulfill their respective, particular objectives and requirements, the aforementioned patents do not disclose a tarp securing hook for securing a tarp to a bale of hay which includes a substantially straight main shank having an insertion tip formed at a first end thereof to permit insertion of the shank into a bale of hay, and an engaging hook integrally formed at a second end of the main shank and arranged to mount a bungee cord utilized to secure a tarp over the associated bale.

In these respects, the tarp securing hook according to the present invention substantially departs from the conventional concepts and designs of the prior art, and in so doing provides an apparatus primarily developed for the purpose of securing a tarp to a bale of hay.

SUMMARY OF THE INVENTION

In view of the foregoing disadvantages inherent in the known types of securing structures now present in the prior art, the present invention provides a new tarp securing hook construction wherein the same can be utilized for securing a tarp or other covering structure to a bale of hay. As such, the general purpose of the present invention, which will be described subsequently in greater detail, is to provide a new tarp securing hook apparatus and method which has many of the advantages of the securing structures mentioned heretofore and many novel features that result in a tarp securing hook which is not anticipated, rendered obvious, suggested, or even implied by any of the prior art securing structures, either alone or in any combination thereof.

To attain this, the present invention generally comprises a hook for securing a tarp to a bale of hay or other pierceable surface. The inventive device includes a substantially straight main shank having an insertion tip formed at a first end thereof to permit insertion of the shank into a bale of hay. An engaging hook is integrally formed at a second end of the main shank and arranged to mount a bungee cord utilized to secure a tarp over the associated bale.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tarp securing hook apparatus and method which has many of the advantages of the securing structures mentioned heretofore and many novel features that result in a tarp securing hook which is not anticipated, rendered obvious, suggested, or even implied by any of the prior art securing structures, either alone or in any combination thereof.

It is another object of the present invention to provide a new tarp securing hook which may be easily and efficiently manufactured and marketed.

It is a further object of the present invention to provide a new tarp securing hook which is of a durable and reliable construction.

An even further object of the present invention is to provide a new tarp securing hook which is susceptible of a low cost of manufacture with regard to both materials and labor, and which accordingly is then susceptible of low prices of sale to the consuming public, thereby making such tarp securing hooks economically available to the buying public.

Still yet another object of the present invention is to provide a new tarp securing hook which provides in the apparatuses and methods of the prior art some of the advantages thereof, while simultaneously overcoming some of the disadvantages normally associated therewith.

Still another object of the present invention is to provide a new tarp securing hook for securing a tarp or other covering structure to a bale of hay or other surface.

Yet another object of the present invention is to provide a new tarp securing hook which includes a substantially straight main shank having an insertion tip formed at a first end thereof to permit insertion of the shank into a bale of hay, and an engaging hook integrally formed at a second end of the main shank and arranged to mount a bungee cord utilized to secure a tarp over the associated bale of hay.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
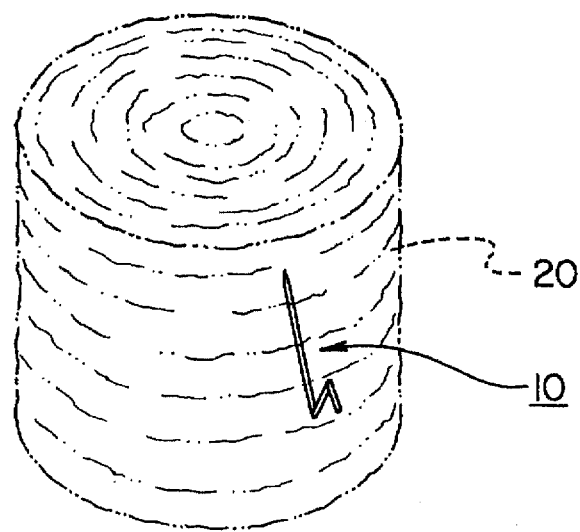
FIG. 1 is an isometric illustration of a tarp securing hook according to the present invention as installed within a bale of hay.
Figure 2:
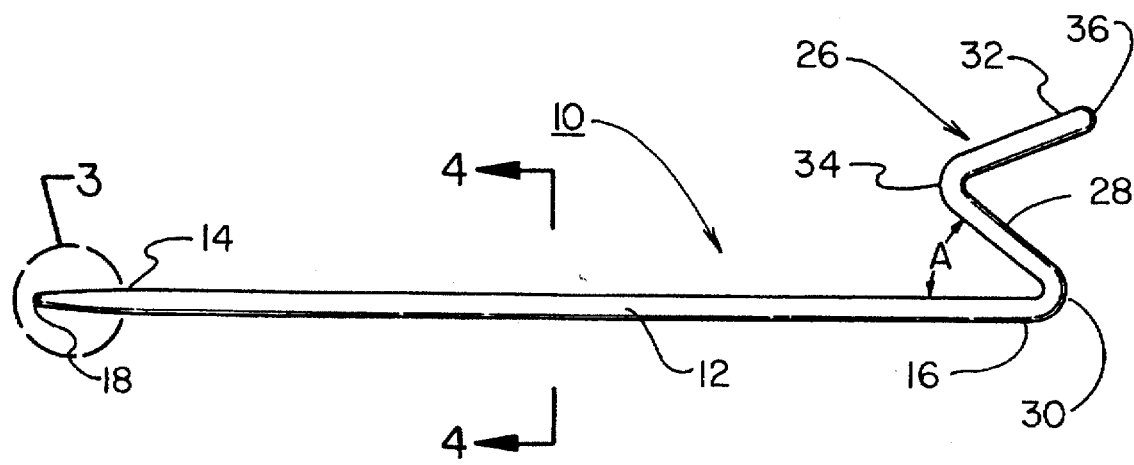
FIG. 2 is a side elevation of the invention.

With reference now to the drawings, and in particular to FIGS. 1–6 thereof, a new tarp securing hook embodying the principles and concepts of the present invention and generally designated by the reference numeral 10 will be described.

Figure 3:
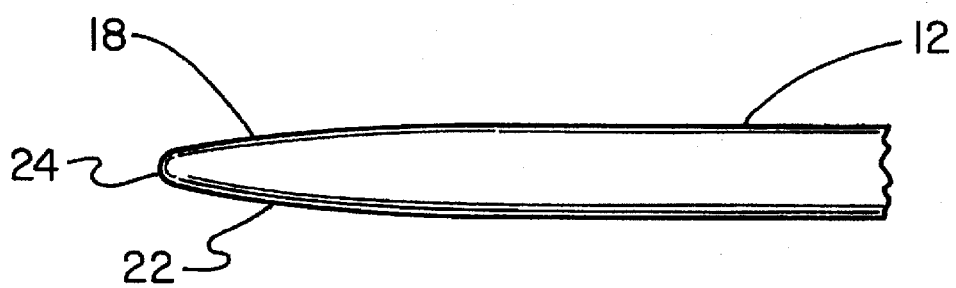
FIG. 3 is an enlarged side elevation of the area set forth in FIG. 2.

More specifically, it will be noted that the tarp securing hook 10 comprises a substantially straight, elongated main shank 12 of preferably circular cross section and having a first end 14 spaced from a second end 16. An insertion tip 18 is integrally formed into the first end 14 of the main shank 12 and is operable to facilitate a piercing insertion of the main shank into a pierceable substrate, such as a bale of hay 20 illustrated in FIG. 1. The insertion tip 18, as best shown in FIG. 3, comprises an integrally formed tapered portion 22 colinearly extending from the first end 14 of the main shank 12 and terminating in a blunt tip 24. Because the substrate into which the device 10 is commonly positioned exhibits ease of piercing, the blunt tip 24 is sufficient to facilitate the same, while simultaneously providing a measure of safety inasmuch as such blunt tip will not easily injure an individual.

Referring back now to FIG. 2, it can be shown that the present invention 10 further comprises an engaging hook means 26 for capturing and engaging a connecting means such as a bungee cord, securing rope, tether, or the like. To this end, the engaging means 26 comprises a first hook portion 28 coupled to the second end 16 of the main shank 12 by a first integral bend 30 such that the first hook portion 28 is oriented at an angle "A" of approximately 45 degrees. The first hook portion 28 is coupled to a second hook portion 32 by a second integral bend 34, with the second hook portion 32 being oriented at an oblique angle relative to the first hook portion 28 to define the substantially V-shaped engaging hook means 26. Further, the second hook portion 32 terminates in a rounded end 36. The rounded end 36 cooperates with the first integral bend 30 to define a pair of spaced surfaces against which an individual's hand may engage to bias the hook 10 into the bale of hay 20 or other substrate.

Figure 4:
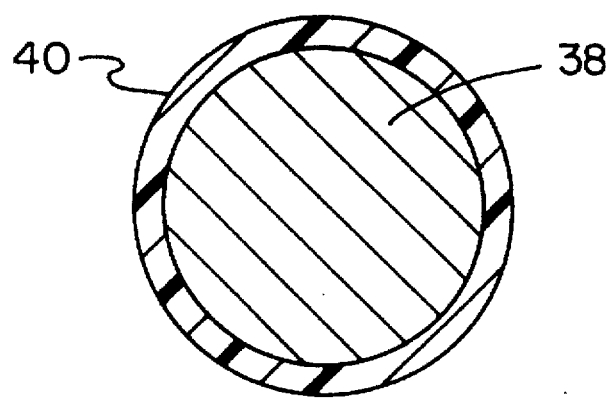
FIG. 4 is a cross-sectional view taken along line 4—4 of FIG. 2.

Preferably, the entire hook 10 is integrally formed of a single center reinforcing member 38, as illustrated in FIG. 4, with an outer protective sheath 40 completely coating and encapsulating the center reinforcing member. The outer protective sheath 40 is operable both to preclude corrosion of the center reinforcing member 38 and to facilitate the identification of the hook member 10 within the bale of hay 20. In other words, it is desirable for the outer protective sheath 40 to be of a contrasting color relative to the bale of hay such that it may be readily identified and removed prior to use of the hay. Preferably, the outer protective sheath 40 is of a bright orange or yellow color. Further, the outer protective sheath 40 may comprise a resilient elastomeric material which serves to further cushion the engagement of the individual's hand against the first integral bend 30 and the rounded end 36 during insertion of the hook 10 into the bale of hay 20.

Figure 5:
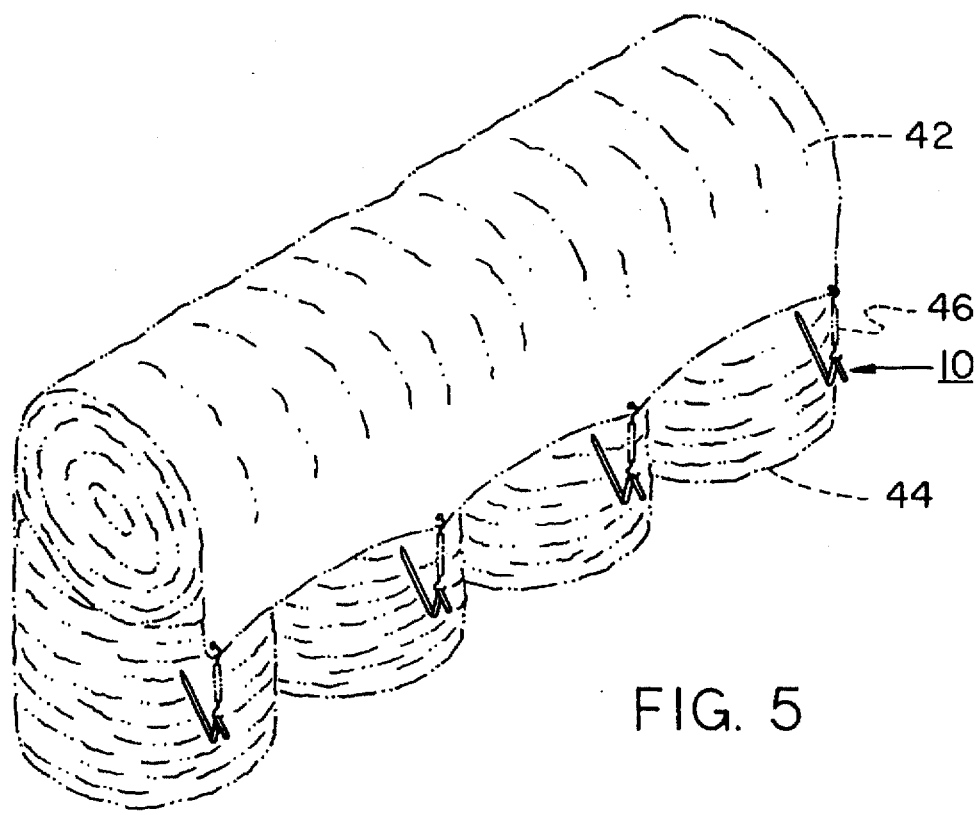
FIG. 5 is an isometric illustration of the present invention in use.
Figure 6:
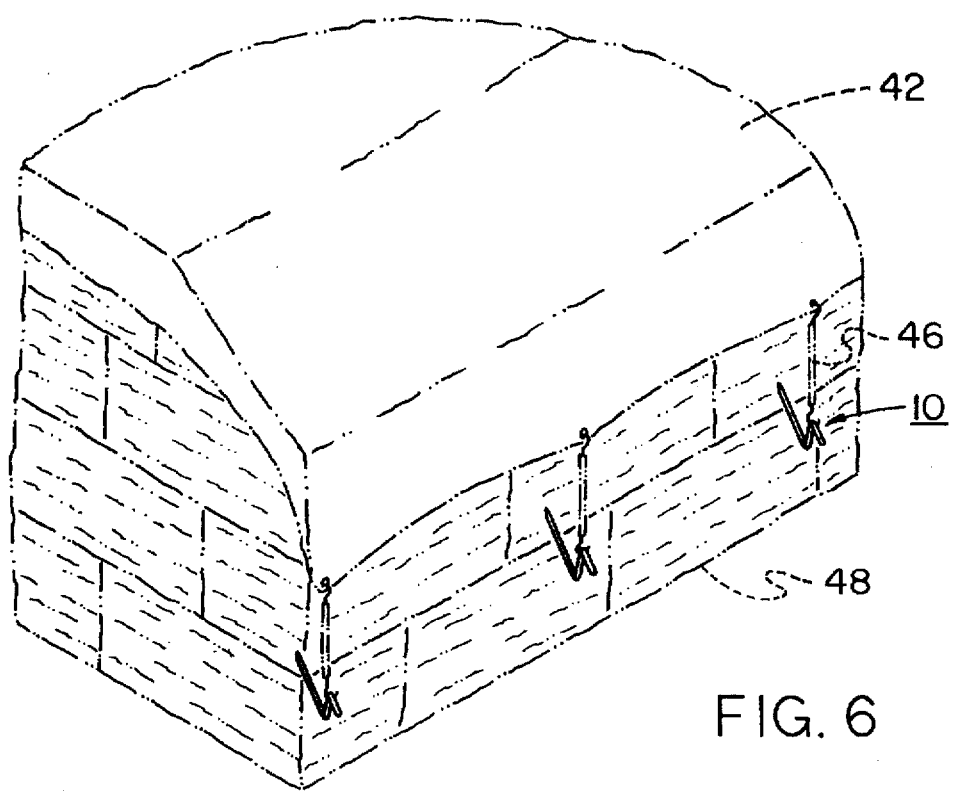
FIG. 6 is a further isometric illustration of the invention in use.

Referring now to FIGS. 5 and 6, the present invention 10 is illustrated in use. As such, the tarp securing hook 10 is advantageously utilized to secure a tarp 42 over a plurality of round bales 44 of hay. In this arrangement, a plurality of hooks 10 are utilized with a connecting means 46 extending between the engaging means 26 of the hook 10 and the tarp 42. As shown in FIG. 6, the present invention 10 may also be utilized with square bales 48 of hay to retain the tarp 42 relative to the bales via the connecting means 46 as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tarp securing hook system comprising:.

at least one bale of hay;

a substantially straight, elongated main shank having a first end spaced from a second end, said shank having an insertion tip integrally formed at said first end thereof for facilitating a piercing insertion of said main shank into a pierceable substrate, said main shank being inserted into said bale of hay;

and, an engaging means coupled to said second end of said main shank for capturing and engaging a connector;

wherein said engaging means comprises a first hook portion coupled at a first end thereof to said second end of said main shank by a first integral bend such that said first hook portion is oriented at an oblique angle relative to said main shank; a second hook portion coupled to a second end of said first hook portion by a second integral bend, with said second hook portion being oriented at an oblique angle relative to said first hook portion.

2. The tarp securing hook of claim 1, wherein said second hook portion terminates in a rounded end, said rounded end cooperating with said first integral bend to define a pair of spaced surfaces against which an individual's hand engages to bias said hook into said pierceable substrate.

3. The tarp securing hook of claim 2, wherein said hook is integrally formed of a single center reinforcing member, and an outer protective sheath completely encapsulating said center reinforcing member.

4. The tarp securing hook of claim 3, wherein said hook is of a contrasting color relative to said bail of hay such that it can be readily identified relative to said bail of hay.

5. The tarp securing hook of claim 4, wherein said outer protective sheath comprises a resilient elastomeric material serving to cushion said engagement of said individual's hand against said first integral bend and said rounded end.

6. The tarp securing hook of claim 5, wherein said main shank is circular in cross section.

7. The tarp securing hook of claim 6, wherein said insertion tip comprises an integrally formed tapered portion colinearly extending from said first end of said main shank and terminating in a blunt tip.

8. A tarp securing hook system comprising:

a tarp;

a connecting means coupled to said tarp for securing said tarp over an object;

a substantially straight, elongated main shank having a first end spaced from a second end, said shank having an insertion tip integrally formed at said first end thereof for facilitating a piercing insertion of said main shank into said object;

and, an engaging means coupled to said second end of said main shank for coupling to said connecting means, said engaging means being coupled with said connecting means and comprising a first hook portion coupled at a first end thereof to said second end of said main shank by a first integral bend such that said first hook portion is oriented at an oblique angle relative to said main shank; a second hook portion coupled to a second end of said first hook portion by a second integral bend, with said second hook portion being oriented at an oblique angle relative to said first hook portion, said second hook portion terminating in a rounded end, said rounded end cooperating with said first integral bend to define a pair of spaced surfaces against which an individual's hand engages to bias said hook into said pierceable substrate, said hook being integrally formed of a single center reinforcing member, and an outer protective sheath completely encapsulating said center reinforcing member.

9. The tarp securing hook of claim 8, wherein said outer protective sheath comprises a resilient elastomeric material serving to cushion said engagement of said individual's hand against said first integral bend and said rounded end.

10. The tarp securing hook of claim 9, wherein said main shank is circular in cross section.

11. The tarp securing hook of claim 10, wherein said insertion tip comprises an integrally formed tapered portion colinearly extending from said first end of said main shank and terminating in a blunt tip.

* * * * *